US010862641B2

(12) United States Patent
Li et al.

(10) Patent No.: US 10,862,641 B2
(45) Date of Patent: *Dec. 8, 2020

(54) DATA TRANSMISSION METHOD AND APPARATUS

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/210,745

(22) Filed: Dec. 5, 2018

(65) Prior Publication Data
US 2019/0109690 A1    Apr. 11, 2019

Related U.S. Application Data

(63) Continuation of application No. 15/318,592, filed as application No. PCT/KR2015/005888 on Jun. 11, 2015, now Pat. No. 10,164,748.

(30) Foreign Application Priority Data

Jun. 13, 2014    (CN) .......................... 2014 1 0265502
Sep. 2, 2014    (CN) .......................... 2014 1 0443470

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04L 1/0026* (2013.01);
(Continued)

(58) Field of Classification Search
CPC . H04L 1/00; H04L 1/0026; H04L 1/06; H04L 5/00; H04L 5/0048; H04L 5/0057;
(Continued)

(56) References Cited

U.S. PATENT DOCUMENTS 8,989,114 B2    3/2015    Kim
9,264,120 B2    2/2016    Jongren
(Continued)

FOREIGN PATENT DOCUMENTS

EP    2 866 358    4/2015
GB    2512634    5/2013
(Continued)

OTHER PUBLICATIONS

PCT/ISA/210 Search Report issued on PCT/KR2015/005888 (pp. 3).
(Continued)

*Primary Examiner* — Tri H Phan
(74) *Attorney, Agent, or Firm* — The Farrell Law Firm, P.C.

(57) ABSTRACT

The present disclosure provides a data transmission method. A UE receives CSI-RS configuration signaling from a base station, measuring and reporting CSI according to the CSI-RS configuration signaling. The UE receives scheduling signaling from the base station, and receives downlink data according to the scheduling signaling. The method provides a way of measuring and feeding back CSI with reduced CSI-RS overhead. The method can configure DMRS ports in a flexible manner. Therefore, performances of MU-MIMO can be optimized.

16 Claims, 8 Drawing Sheets

(51) Int. Cl.
  *H04L 1/00* (2006.01)
  *H04W 52/42* (2009.01)
  *H04W 72/04* (2009.01)
  *H04W 72/12* (2009.01)
(52) U.S. Cl.
  CPC .......... *H04L 5/0057* (2013.01); *H04W 52/42* (2013.01); *H04W 72/0473* (2013.01); *H04W 72/1273* (2013.01)
(58) Field of Classification Search
  CPC ....... H04L 5/0007; H04L 5/001; H04L 5/003; H04L 27/26; H04L 27/2647; H04W 24/10; H04W 52/42; H04W 72/04; H04W 72/0473; H04W 72/12; H04W 72/1273; H04W 52/04; H04W 52/0473; H04W 52/12; H04W 52/1273; H04W 52/143; H04W 52/267; H04W 52/325; H04B 7/0452; H04B 7/0456; H04B 7/06; H04B 17/345
  See application file for complete search history.

(56) References Cited

U.S. PATENT DOCUMENTS

| | | | | |
|---|---|---|---|---|
| 9,537,552 | B2 * | 1/2017 | Li | H04B 7/0456 |
| 9,537,631 | B2 * | 1/2017 | Park | H04B 7/0632 |
| 9,680,552 | B2 * | 6/2017 | Ko | H04B 7/0634 |
| 9,698,938 | B2 * | 7/2017 | Lee | H04J 11/005 |
| 9,742,537 | B2 * | 8/2017 | Suzuki | H04W 24/10 |
| 9,794,817 | B2 | 10/2017 | Ko | |
| 9,800,379 | B2 | 10/2017 | Kim | |
| 9,838,189 | B2 * | 12/2017 | Zheng | H04L 5/0051 |
| 9,936,405 | B2 * | 4/2018 | Seo | H04W 72/04 |
| 9,954,640 | B2 * | 4/2018 | Park | H04W 24/10 |
| 10,122,481 | B2 * | 11/2018 | Seo | H04B 7/0626 |
| 10,164,748 | B2 * | 12/2018 | Li | H04L 5/0048 |
| 10,321,469 | B2 * | 6/2019 | Yokomakura | H04W 24/10 |
| 10,425,141 | B2 * | 9/2019 | Noh | H04B 7/04 |
| 2012/0134275 | A1 | 5/2012 | Choi | |
| 2012/0140708 | A1 | 6/2012 | Choudhury | |
| 2012/0213261 | A1 | 8/2012 | Sayana | |
| 2012/0281554 | A1 | 11/2012 | Gao | |
| 2012/0287875 | A1 | 11/2012 | Kim et al. | |
| 2013/0039199 | A1 | 2/2013 | Liao | |
| 2013/0114430 | A1 | 5/2013 | Koivisto | |
| 2013/0196675 | A1 | 8/2013 | Xiao | |
| 2013/0242902 | A1 | 9/2013 | Liu et al. | |
| 2013/0267268 | A1 | 10/2013 | Lee | |
| 2013/0328722 | A1 | 12/2013 | Wemersson et al. | |
| 2014/0056156 | A1 | 2/2014 | Jongren | |
| 2014/0079146 | A1 | 3/2014 | Kim et al. | |
| 2014/0369279 | A1 | 12/2014 | Yu | |
| 2015/0029966 | A1 | 1/2015 | Park | |
| 2015/0103768 | A1 | 4/2015 | Chen et al. | |
| 2015/0124736 | A1 | 5/2015 | Ko et al. | |
| 2015/0223208 | A1 | 8/2015 | Park et al. | |
| 2015/0341152 | A1 | 11/2015 | Kim | |
| 2015/0358848 | A1 | 12/2015 | Kim | |
| 2016/0050006 | A1 | 2/2016 | Ko | |
| 2016/0112177 | A1 * | 4/2016 | Zheng | H04L 5/0051 370/330 |
| 2017/0085355 | A1 * | 3/2017 | Hayashi | H04L 5/1469 |

FOREIGN PATENT DOCUMENTS

| | | |
|---|---|---|
| JP | 2012-147103 | 8/2012 |
| JP | 2015-534346 | 11/2015 |
| WO | WO 2013/138810 | 9/2013 |
| WO | WO 2013/159620 | 10/2013 |
| WO | WO 2014/003384 | 1/2014 |
| WO | WO 2014/020828 | 2/2014 |
| WO | WO 2014/046507 | 3/2014 |
| WO | WO 2014/054903 | 4/2014 |

OTHER PUBLICATIONS

PCT/ISA/237 Written Opinion issued on PCT/KR2015/005888 (pp. 8).
3GPP TS 36.213 V12.1.0,3GPP; TSG RAN; Evolved Universal Terrestrial Radio Access (E-UTRA); Physical layer procedures (Release 12), Mar. 21, 2014, Copyright 2014, 3GPP Organizational Partners (ARIB, ATIS, CCSA, ETSI, TTA, TTC), pp. 189.
Qualcomm Incorporated, "Framework for DL CoMP CSI Test", R4-133071, 3GPP TSG-RAN WG4 #66, Jan. 28-Feb. 1, 2013, 7 pages.
Renesas Mobile Europe Ltd., "CQI Definition", R1-123580, 3GPP TSG-RAN WG1 Meeting #70, Aug. 13-17, 2012, 12 pages.
European Search Report dated Jan. 22, 2018 issued in counterpart application No. 15807104.3-1219, 11 pages.
Alcatel-Lucent et al.,"Considerations on CSI Feedback Enhancements for High-Priority Antenna Configurations", R1-112420, 3GPP TSG-RAN WG1 #66, Aug. 22-26, 2011, 7 pages.
NTT DoCoMo, "Transparent/Non-Transparent MU-MIMO in LTE-Advanced", R1-102299, 3GPP TSG RAN WG1 Meeting #60bis, Apr. 12-16, 2010, 6 pages.
Samsung, "Antenna Port to TXRU Virtualization Mapping", R1-144751, 3GPP TSG RAN WG1 Meeting #79, Nov. 10-14, 2014, 3 pages.
Japanese Office Action dated Feb. 18, 2019 issued in counterpart application No. 2016-571406, 10 pages.
Japanese Office Action dated Oct. 15, 2019 issued in counterpart application No. 2016-571406, 7 pages.
Indian Examination Report dated Jun. 25, 2020 issued in counterpart application No. 201737000511, 7 pages.

* cited by examiner

DATA TRANSMISSION METHOD AND APPARATUS

PRIORITY

This application is a Continuation Application of application Ser. No. 15/318,592 filed with the U.S. Patent and Trademark Office on Dec. 13, 2016, which is a National Phase Entry of International Application No. PCT/KR2015/005888, filed on Jun. 11, 2015, and claims priority under 35 U.S.C. § 119(a) to Patent Applications No. 201410443470.5 and 201410265502.7, filed in the Chinese Intellectual Property Office on Sep. 2, 2014 and Jun. 13, 2014, respectively, the contents of each of which are incorporated herein by reference.

BACKGROUND

1. Field of the Disclosure

The present disclosure relates to wireless communication systems, and particularly to a method and apparatus for configuring a channel state information reference signal (CSI-RS), measuring channel state information (CSI) and configuring a de-modulation reference signal (DMRS).

2. Description of the Related Art

In 3rd generation project partnership (3GPP) long term evolution (LTE) systems, each radio frame has a length of 10 ms and is equally divided into 10 subframes. As shown in FIG. 1, taking a frequency division duplexing (FDD) system as an example, each radio frame has a length of 10 ms, and includes 10 subframes. Each subframe has a length of 1 ms, and is composed of two consecutive time slots, i.e., the k'th subframe includes time slot 2 k and time slot 2 k+1, k=0, 1, . . . 9. Each time slot has a length of 0.5 ms. A downlink transmission time interval (TTI) is defined in a subframe.

FIG. 2 is a schematic diagram illustrating a downlink subframe in an LTE system. As shown in FIG. 2, the preceding n orthogonal frequency division multiplexing (OFDM) symbols (n is 1, 2 or 3) are a downlink control channel region for transporting downlink control information of users. Downlink control channels include physical control format indicator channel (PCFICH), physical hybrid automatic repeat request (HARM) indicator channel (PHICH) and physical downlink control channel (PDCCH). Remaining OFDM symbols are used for transporting physical downlink shared channel (PDSCH) and enhanced PDCCH (EPDCCH). Downlink physical channels are a collection of resource elements. A resource element (RE) is the smallest unit of time/frequency resources. RE is a subcarrier in frequency domain and an OFDM symbol in time domain. The granularity of physical resource allocation is physical resource block (PRB). A PRB includes 12 consecutive subcarriers in frequency domain, and corresponds to a time slot in time domain. Two PRBs within two time slots on the same subcarriers in a subframe are referred to as a PRB pair. Different REs may have different usages, e.g., cell-specific reference signal (CRS), user-specific DMRS and channel state information reference signal (CSI-RS). In a subframe, at most 40 REs may be used for CSI-RS transmission, and a base station may configure some or all of the REs to be used for CSI-RS transmission.

The number of CSI-RS ports may be configured to be 1, 2, 4, or 8 according to the number of antennas deployed by the base station. As shown in FIG. 3, when one or two CSI-RS ports are configured, CSI-RS is transported in two REs on the same subcarrier of two adjacent OFDM symbols. When four CSI-RS ports are configured, CSI-RS is transported in four REs located in two adjacent OFDM symbols and two subcarriers. When eight CSI-RS ports are configured, CSI-RS is transported in eight REs which are mapped onto four subcarriers of two adjacent OFDM symbols.

Information that needs to be specified may include the periodicity, the subframe offset of CSI-RS and REs in a subframe, to identify time/frequency resources on which the CSI-RS resources are mapped. As shown in Table 1, CSI-RS subframe configuration is used for identifying the position in a subframe occupied by CSI-RS, i.e., indicating the periodicity $T_{CSI\text{-}RS}$ and the subframe offset $\Delta_{CSI\text{-}RS}$ of CSI-RS. Specifically, subframes for CSI-RS transmission satisfy $(10n_f + \lfloor n_s/2 \rfloor - \Delta_{CSI\text{-}RS}) \bmod T_{CSI\text{-}RS} = 0$, where $n_f$ is the system frame number, $n_s$ is the time slot ID in a frame.

TABLE 1

Table 1: CSI RS subframe configuration

| CSI RS subframe configuration | CSI RS periodicity $T_{CSI\text{-}RS}$ | CSI RS subframe offset $\Delta_{CSI\text{-}RS}$ |
|---|---|---|
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}RS}$-35 |
| 75-154 | 80 | $I_{CSI\text{-}RS}$-75 |

Table 2 shows REs onto which each CSI-RS configuration is mapped. In a PRB pair, REs corresponding to CSI-RS port 15 in CSI-RS configuration are determined by a two-tuple (k',l') according to the number of CSI-RS ports, wherein k' is a subcarrier index in the PRBs, l' is an index of an OFDM symbol in a time slot.

According to LTE standards, when one or two CSI-RS ports are configured, it may be regarded that the power of CSI-RS REs is normalized because each antenna may transmit downlink signals in all REs in an OFDM symbol. When four CSI-RS ports are configured, preceding 2 CSI-RS ports and last 2 CSI-RS ports are transmitted in different subcarriers respectively, which results in that the power of each CSI-RS port may be doubled, i.e., increased by 3 dB. When eight CSI-RS ports are configured, every two CSI-RS ports occupy one subcarrier, and do not transmit any signal in subcarriers of other CSI-RS ports, so that the power of each CSI-RS port may be quadrupled, i.e., increased by 6 dB.

Based on the above CSI-RS structure, conventional LTE systems may support downlink data transmission using 8 antenna ports. As shown in FIG. 4, antennas are generally deployed as a one-dimensional antenna array in the horizontal direction, and are made to direct at different horizontal angles via beamforming. Terminals may be located at different positions in the vertical direction and may be at different distances from the base station, and thus correspond to different vertical angles. In subsequent enhanced LTE systems, each cell may be configured with 16, 32, 64 or more transmitting antennas to make use of the gain of spatial multiplexing, increase cell throughput and reduce inter-user interferences. As shown in FIG. 5, beamforming in the vertical direction and beamforming in the horizontal direction may be applied to a two-dimensional antenna array to further reduce interference between terminals corresponding to different vertical direction angles and between terminals corresponding to different horizontal direction angles.

As such, cell throughput can be further increased, as shown in FIG. 6.

For systems configured with more than 8 physical antennas, e.g., the two-dimensional antenna array as shown in FIG. 5, proper methods are needed to process multi-user multiple input multiple output (MU-MIMO) transmission and CSI measurement and feedback. The more physical antennas configured, the narrower beams can be generated, and more user equipment (UEs) can be multiplexed using MU-MIMO techniques. A to-be-solved problem is how to design DMRS to better support MU-MIMO. If each physical transmitting antenna is configured with a CSI-RS port for CSI measurement, huge CSI-RS overhead may be generated. It is a problem to be solved that how to reduce the resources occupied by CSI-RS. Accordingly, a UE may measure the state of a radio channel according to CSI-RS configured, and feed CSI back. CSI information includes a rank indicator (RI), a channel quality indicator (CQI), a pre-coding matrix indicator (PMI) and etc. Another to-be-solved problem is how to measure and feedback CSI based on the CSI-RS structure adopted.

channel state based on the configuration information. The CSI process is associated with at least two non-zero power (NZP) channel state information reference signal (CSI-RS) resources, the UE assumes reference physical downlink shared channel (PDSCH) transmitted power corresponding to different NZP CSI-RS resources via higher layer signaling when measuring channel states in the CSI based on the at least two NZP CSI-RS resources, and the assumed reference PDSCH transmitted power is based on $P_c$ which is a ratio of PDSCH energy per resource element (EPRE) to NZP CSI-RS energy per EPRE.

According to another aspect of the present disclosure, a user equipment (UE) for data processing is provided that includes a configuration signaling receiving module configured to receive configuration information related to a channel state information (CSI) process from a base station (BS); and a CSI measuring and reporting module configured to measure a channel state based on the configuration information, with the CSI process being associated with at least

TABLE 2

Table 2: mapping table of CSI-RS configuration and two-tuples (k', l')

| | | the number of configured CSI-RS | | | | | |
|---|---|---|---|---|---|---|---|
| CSI-RS | | 1 or 2 | | 4 | | 8 | |
| | configuration | (k', l') | $n_s$ mod 2 | (k', l') | $n_s$ mod 2 | (k', l') | $n_s$ mod 2 |
| frame structure | 0 | (9, 5) | 0 | (9, 5) | 0 | (9, 5) | 0 |
| types 1 and 2 | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| applicable only to | 20 | (11, 1) | 1 | (11, 1) | 1 | (11, 1) | 1 |
| frame structure | 21 | (9, 1) | 1 | (9, 1) | 1 | (9, 1) | 1 |
| type 2 | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

SUMMARY

The present disclosure relates to wireless communication systems, and particularly to a method and apparatus for configuring CSI-RS, measuring CSI and configuring DMRS.

According to an aspect of the present disclosure, a method of a user equipment (UE) is provided, with the method including receiving configuration information related to a channel state information (CSI) process and measuring a two non-zero power (NZP) channel state information reference signal (CSI-RS) resources, with the UE assuming reference physical downlink shared channel (PDSCH) transmitted power corresponding to different NZP CSI-RS resources via higher layer signaling when measuring channel states in the CSI based on the at least two NZP CSI-RS resources, and with the reference PDSCH transmitted power being based on $P_c$ which is a ratio of PDSCH energy per resource element (EPRE) to NZP CSI-RS energy per (EPRE).

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE DISCLOSURE

Figure 1:
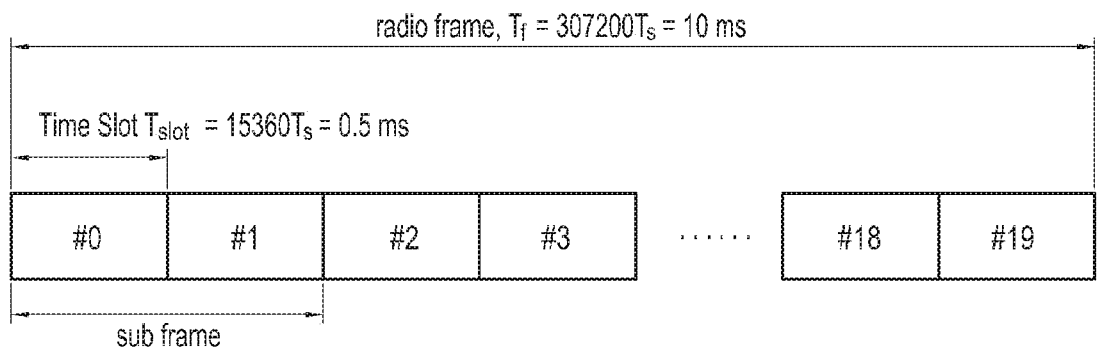
FIG. 1 is a schematic diagram illustrating an LTE FDD frame.
Figure 2:
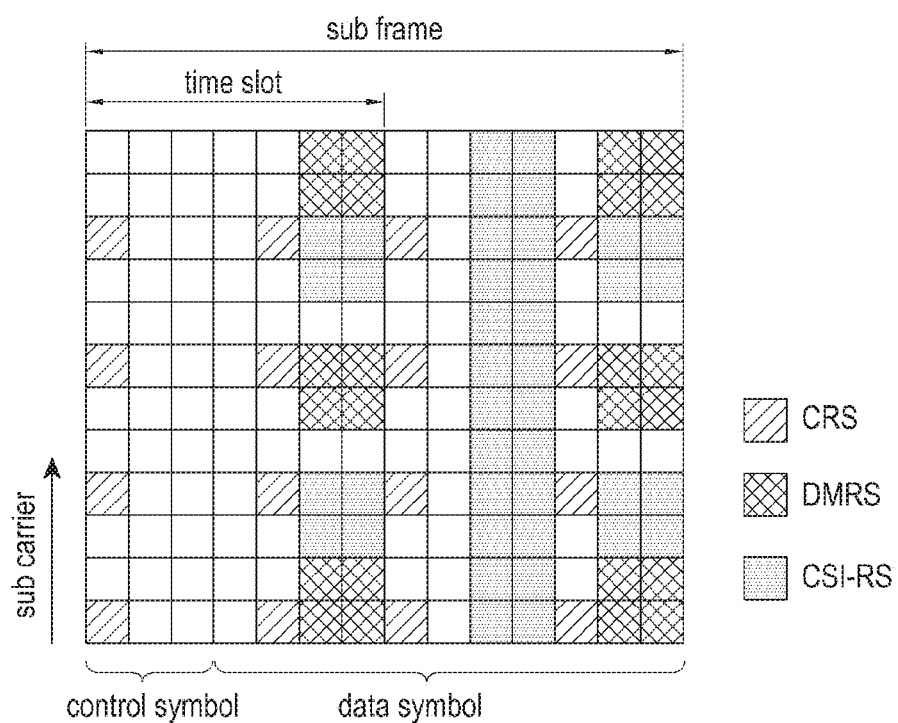
FIG. 2 is a schematic diagram illustrating a subframe.
Figure 3:
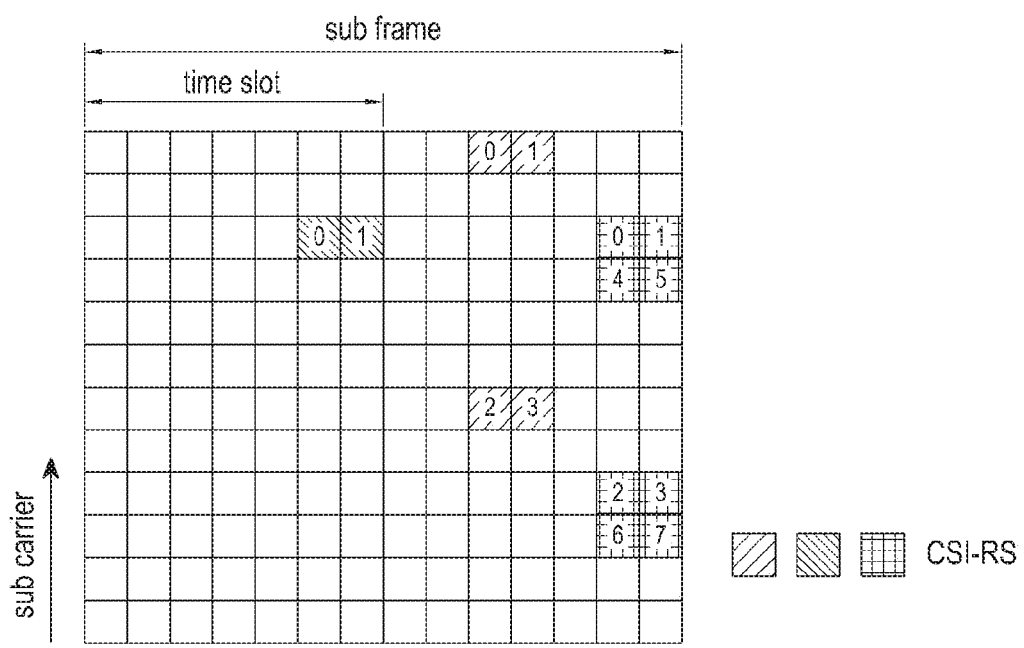
FIG. 3 is a schematic diagram illustrating CSI-RS.
Figure 4:
FIG. 4 is a schematic diagram illustrating an antenna array.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

A method and apparatus proposed in various embodiments of the present disclosure may be applied to various mobile communication systems such as a Long Term Evolution (LTE) mobile communication system, an LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a 3rd Generation Project Partnership 2 (3GPP2), a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) 802.16m communication system, an IEEE 802.11 communication system, an Evolved Packet System (EPS), a Mobile Internet Protocol (Mobile IP) system, a Wireless Universal Serial Bus (Wireless USB) system and/or the like.

Figure 7:
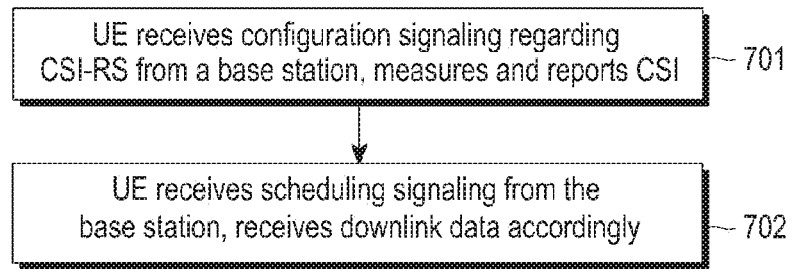
FIG. 7 is a flowchart illustrating a method in accordance with an embodiment of the present disclosure.

When the number of transmitting antennas configured in a base station is increased, e.g., using a two-dimensional antenna array supporting 16, 32, 64 or more transmitting antennas, it is necessary to modify the design of reference signals. A solution is to reduce the overhead of CSI-RS while ensuring requirements of CSI feedback are met. Another solution is to make DMRS better support MU-MIMO transmission. FIG. 7 is a schematic diagram illustrating a method in accordance with the embodiments of the present disclosure. The method may include the following procedures.

At block 701, a UE receives configuration signaling for CSI-RS from a base station, measures and reports CSI according to the CSI-RS configuration signaling.

The configuration signaling received by the UE may include: configuration information of a CSI process, e.g., configuration information of NZP CSI-RS for measuring channel characteristics, configuration information of CSI-IM resource for measuring interferences. Configuration of CSI-IM resource may be implemented by configuring ZP CSI-RS. In an example, the configuration information of the CSI process may include configuration information of at least two NZP CSI-RS.

In a system configured with relatively more physical antenna units, in order to measure channels using NZP CSI-RS, a UE may be configured to receive multiple NZP CSI-RS. Each NZP CSI-RS may be used for measuring some of characteristics of the multi-antenna system. Therefore, measurement results of multiple NZP CSI-RS can be combined to obtain complete CSI information. Taking a two-dimensional antenna array as an example, resources configured for one NZP CSI-RS may be used for measuring characteristics of the antenna array in the horizontal direction while resources configured for the other NZP CSI-RS may be used for measuring characteristics of the antenna array in the vertical direction; the characteristics on the horizontal direction and the characteristics on the vertical direction may be combined to generate complete CSI information. Configuration information of each NZP CSI-RS may specify a periodicity, a subframe offset and REs occupied in a subframe using the method defined in LTE Release 10, i.e., a NZP CSI-RS supports at most 8 CSI-RS ports. Alternatively, the configuration information of each NZP CSI-RS may include CSI-RS resource of over 8 CSI-RS ports, but in this case, modifications need to be made to the RE mapping scheme.

Regarding the design of signaling mechanism, for a CSI process, multiple NZP CSI-RS included in the CSI process may be directly configured, or a collection of the multiple NZP CSI-RS may be re-defined as a combined NZP CSI-RS. For the latter design, a CSI process by definition only includes a combined NZP CSI-RS, but actually includes the multiple NZP CSI-RS. The following description takes directly configuring multiple NZP CSI-RS for a CSI process as an example. The following method can be applied to situations where a collection of multiple NZP CSI-RS of a CSI process is re-defined as a combined NZP CSI-RS, and it can be applied to each NZP CSI-RS in the combined NZP CSI-RS.

At block 702, the UE receives scheduling signaling from the base station, and receives downlink data according to the scheduling signaling.

The UE may receive scheduling signaling for scheduling downlink data transmission, perform channel estimation based on the information on the number of layers and DMRS ports of data transmission in the scheduling signaling, and decodes downlink data. More DMRS ports may be used for MU-MIMO to better support multi-user multiplexing.

The mechanism of the present disclosure is hereinafter described in detail with reference to the following examples.

Example 1

In a conventional LTE system, a CSI process refers to a NZP CSI-RS resource and a ZP CSI-RS resource serving as CSI-IM. In CSI measurement, NZP CSI-RS resource are used for channel measurement, CSI-MI resource are used for interference measurement. Results of the channel measurement and the interference measurement are combined to generate the complete CSI. In a system configured with relatively more physical antenna units, e.g., using a two-dimensional antenna array supporting 16, 32, 64 or more transmitting antenna units, channel measurement performed through an NZP CSI-RS port configured for each physical transmitting power as in conventional systems may generate large overhead of NZP CSI-RS resource.

Figure 5:
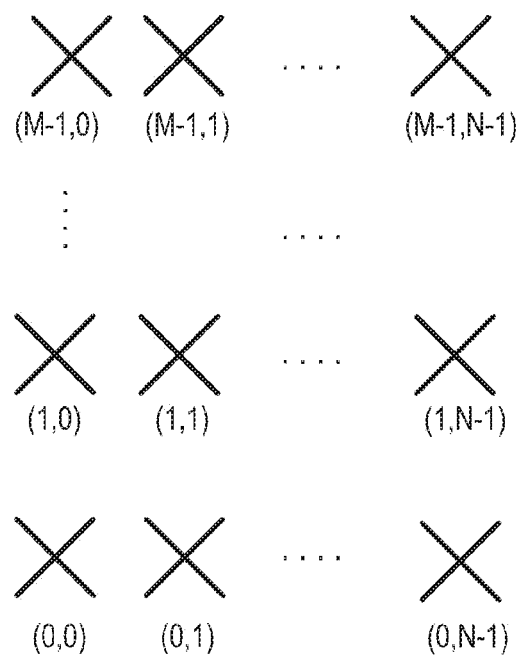
FIG. 5 is a schematic diagram illustrating a two-dimensional antenna array.
Figure 6:
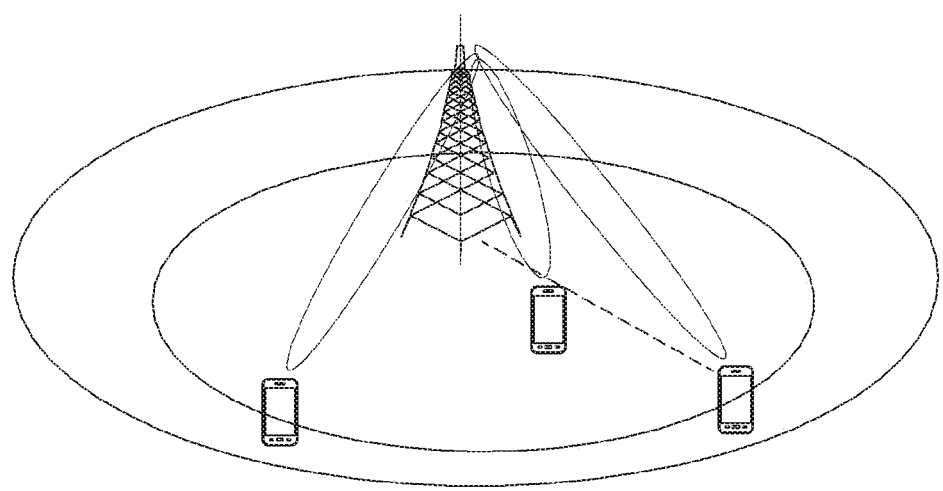
FIG. 6 is a schematic diagram illustrating beamforming.

A method for reducing overhead includes configuring multiple NZP CSI-RS resources, and combining measurements of the multiple NZP CSI-RS resources to generate the CSI result. Each of the multiple NZP CSI-RS resources may include fewer NZP CSI-RS ports, so that total number of NZP CSI-RS ports is less than the total number of physical antenna units, which results in smaller total overhead of NZP CSI-RS resources. In an example, two NZP CSI-RS resources may be configured. A CSI process may be configured with multiple NZP CSI-RS resources, and configuration information of the multiple NZP CSI-RS resources may be included in configuration information of a CSI process in configuration signaling sent by the base station. In an example, two NZP CSI-RS resources may be configured for a CSI process. As shown in FIG. 5, it is supposed a two-dimensional antenna array is deployed in direction y and direction x and has respectively M rows and N columns. In an example, direction y may be vertical, direction x may be horizontal. In other examples, directions x and y may be any two-dimensional directions. The following takes the vertical direction and the horizontal direction as an example. Various methods may be adopted to map each CSI-RS port of the multiple CSI-RS resources onto physical antenna units in the two-dimensional antenna array. Methods for mapping CSI-RS resources respectively in the vertical direction and in the horizontal direction are described in the following.

Figure 8:
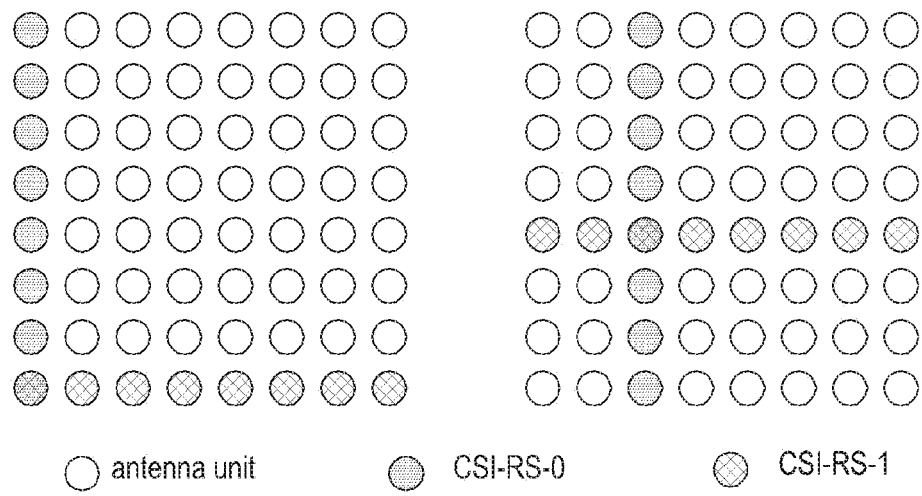
FIG. 8 is a schematic diagram illustrating a first CSI-RS configuration.

A co-polarized two-dimensional antenna array having M rows and N columns may be configured with one CSI-RS resource including M NZP CSI-RS ports, denoted as CSI-RS-0, for measuring vertical characteristics, and may be configured with another CSI-RS resource including N NZP CSI-RS ports, denoted as CSI-RS-1, for measuring horizontal characteristics. As shown in FIG. 8, supposing an antenna array has 8 rows and 8 columns, is configured with CSI-RS-0 including 8 ports in the vertical direction and CSI-RS-1 including 8 ports in the horizontal direction, channel characteristics obtained from measurement on CSI-RS-0 and CSI-RS-1 may be combined to obtained the final CSI of the antenna array.

Figure 9:
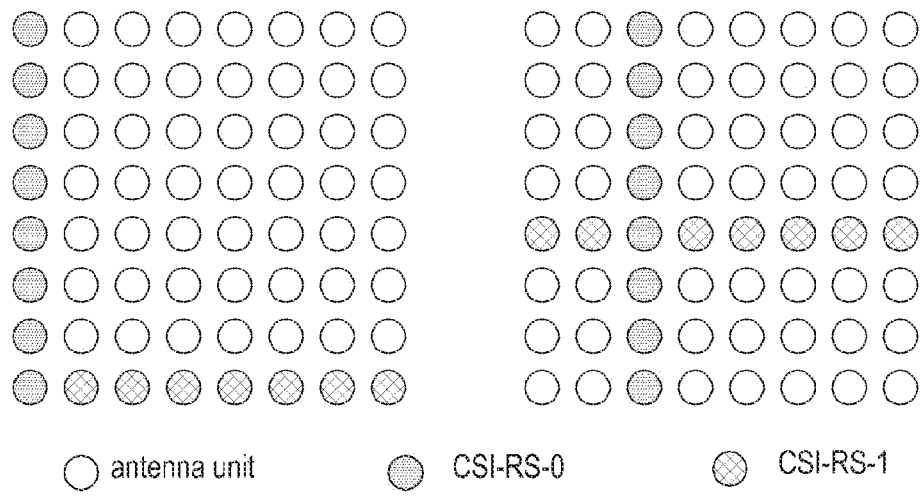
FIG. 9 is a schematic diagram illustrating a second CSI-RS configuration.

In FIG. 8, one NZP CSI-RS port in CSI-RS-0 and one NZP CSI-RS port in CSI-RS-1 are mapped onto the same antenna unit. The antenna unit is referred to as a shared antenna unit. To avoid redundancy of NZP CSI-RS ports, the shared antenna unit may only transmit one CSI-RS port as shown in FIG. 9, i.e., the CSI-RS port is shared by channel measurement in the horizontal direction and in the vertical direction. Accordingly, the UE receives NZP CSI-RS signal of one NZP CSI-RS port from the shared antenna unit and uses the NZP CSI-RS signal for channel measurement in both the horizontal direction and the vertical direction. The shared antenna unit may be pre-set, e.g., in the left drawings in FIG. 8 and FIG. 9, the shared antenna unit correspond to port 0 of both CSI-RS-0 and CSI-RS-1; in the right drawings in FIG. 8 and FIG. 9, the shared antenna unit corresponds to port 3 of CSI-RS-0 and port 2 of CSI-RS-1. Alternatively, the shared antenna unit may be configured semi-statically by higher layer signaling, or indicated by physical layer signaling, or may correspond to an antenna unit statically defined in the standard.

Figure 10:
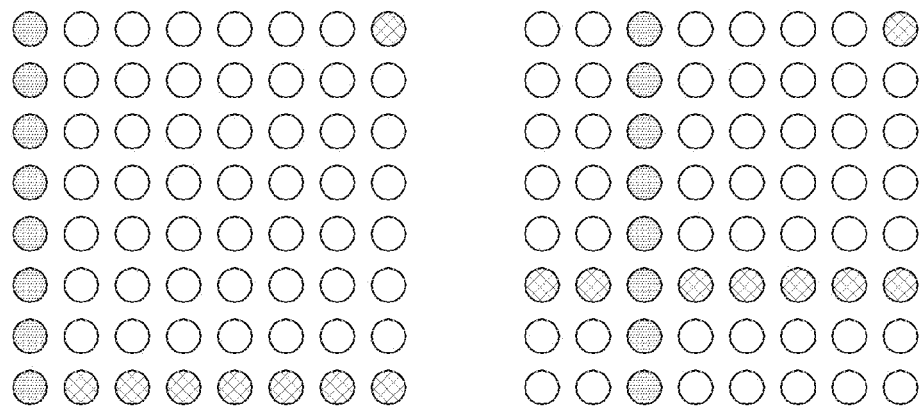
FIG. 10 is a schematic diagram illustrating a third CSI-RS configuration.

In FIG. 9, only M+N=15 CSI-RS ports actually need to be transmitted because the shared antenna unit occupies only one CSI-RS port. The structure of CSI-RS multiplexes two CSI-RS ports on two REs using a Walsh code having a length of 2, thus LTE systems are always capable of supporting an even number of CSI-RS ports. When the shared antenna unit occupies only one CSI-RS port, the unoccupied CSI-RS port may be used for transmitting CSI-RS of another antenna unit to obtain measurement results of plural antenna units. In an example as shown in FIG. 10, the additional antenna unit may be an antenna unit having the longest distance from both the antenna units of CSI-RS-0 and the antenna units of CSI-RS-1. The CSI-RS measurement result of the additional antenna unit may be used for revising the CSI measurement results based on CSI-RS-0 and CSI-RS-1. The UE may be informed of the additional antenna unit through signaling from the base station. Alternatively, the additional antenna unit used for sending and receiving NZP CSI-RS signals may be pre-determined. For example, the shared antenna unit occupies only one NZP CSI-RS port in CSI-RS-0, and NZP CSI-RS of the newly added antenna units may be transmitted via the NZP CSI-RS port corresponding to the shared antenna unit in CSI-RS-1.

Figure 11:
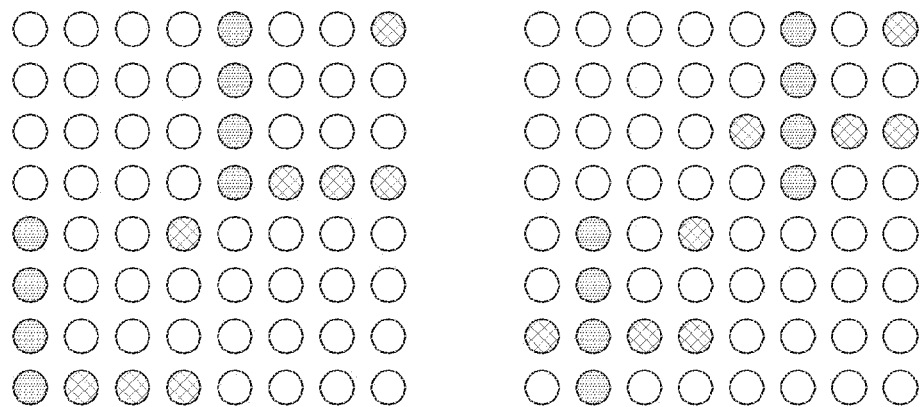
FIG. 11 is a schematic diagram illustrating a fourth CSI-RS configuration.
Figure 12:
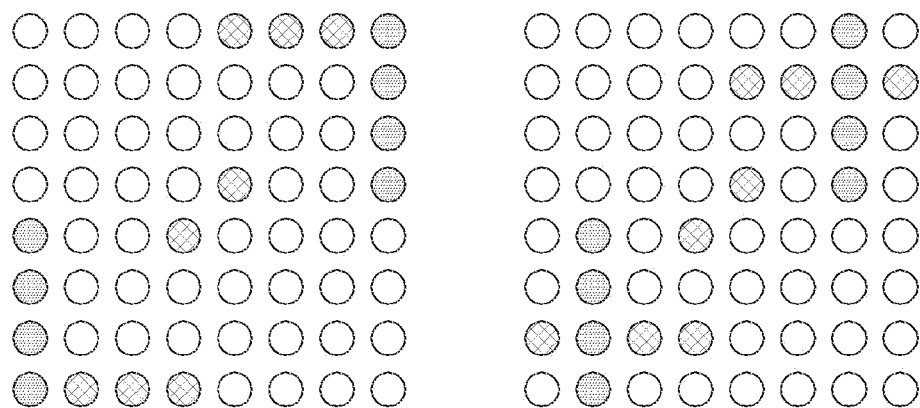
FIG. 12 is a schematic diagram illustrating a fifth CSI-RS configuration.

Alternatively, the two-dimensional antenna array may be divided into groups, and NZP CSI-RS resources are allocated to each group of antenna units on a diagonal line. For example, a two-dimensional antenna array may be equally divided into 4 groups of antenna units, each of which includes antenna units having M/2 rows and N/2 columns. For two groups of antenna units on a diagonal line, NZP CSI-RS resources may be configured according to the above methods. For each group of antenna units having 4 rows and 4 columns in FIG. 11, 4 CSI-RS ports may be configured according to a method similar to that as shown in FIG. 10 for measuring vertical characteristics, and 4 CSI-RS ports may be configured for measuring horizontal characteristics. The shared antenna unit occupies only one CSI-RS port, thus the other antenna unit may be used for transmitting CSI-RS of another port to enhance CSI measurement performances. As shown in FIG. 12, each group of antenna units may adopt different mapping methods for CSI-RS transmission. For an example, for the group of antenna units at the lower left, the antenna units at the left and at the bottom are used for transmitting CSI-RS; for the group of antenna units at the upper right, the antenna units at the right and at the top are used for transmitting CSI-RS. The symmetrical structure is good for equalizing the effect of channel measurements and improving measurement accuracy.

A cross-polarized two-dimensional antenna array having M rows and N columns may be configured with one CSI-RS resource including M NZP CSI-RS ports, denoted as CSI-RS-0, for measuring vertical characteristics, and configured with another CSI-RS resource including 2N NZP CSI-RS ports, denoted as CSI-RS-1, for measuring horizontal characteristics. For example, when N is smaller or equal to 4, CSI-RS-1 includes not more than 8 CSI-RS ports. Alternatively, a cross-polarized two-dimensional antenna array may be configured with a CSI-RS resource including 2M CSI-RS ports, denoted as CSI-RS-0, for measuring vertical characteristics, and configured with another CSI-RS resource including another N CSI-RS ports, denoted as CSI-RS-1, for measuring horizontal characteristics. For example, when M is smaller or equal to 4, CSI-RS-0 includes not more than 8 CSI-RS ports. Channel characteristics obtained from measurement on CSI-RS-0 and CSI-RS-1 may be combined to obtain the final CSI information of the whole antenna array.

FIGS. 8-12 may still be used for illustrating the method of configuring CSI-RS ports in this situation. For example, it is supposed an antenna array includes 8 rows and 4 columns and is configured with CSI-RS-0 having 8 ports in the vertical direction and CSI-RS-1 having 8 ports in the horizontal direction to measure the two polarization directions. The first 4 columns and last 4 columns of antenna ports represent different polarization directions respectively. According to the method as shown in FIGS. 8-10, different numbers of CSI-RS ports are transmitted in different polarization directions. Regarding the method as shown in FIG. 9 and FIG. 10, only one NZP CSI-RS port is used for the shared antenna unit, and the remaining CSI-RS port may be used for transmit NZP CSI-RS of another antenna unit in a polarized direction where there are less NZP CSI-RS ports configured, so as to reduce the difference between the two polarized directions. In the method as shown in FIG. 9 and FIG. 10, the two NZP CSI-RS ports corresponding to the shared antenna unit are used for transmitting NZP CSI-RS for two antenna units in different polarized directions. Alternatively, a two-dimensional antenna array may be divided into groups, e.g., the two-dimensional antenna array may be equally divided into 4 groups of antenna units according to the method of FIG. 11 or FIG. 12. Because the first 4 columns and the last 4 columns of antenna ports represent different polarization directions, the two polarization directions have the same number of transmitting CSI-RS ports.

But each polarization direction does not have all of its rows of antenna units transmitting CSI-RS.

Figure 16:
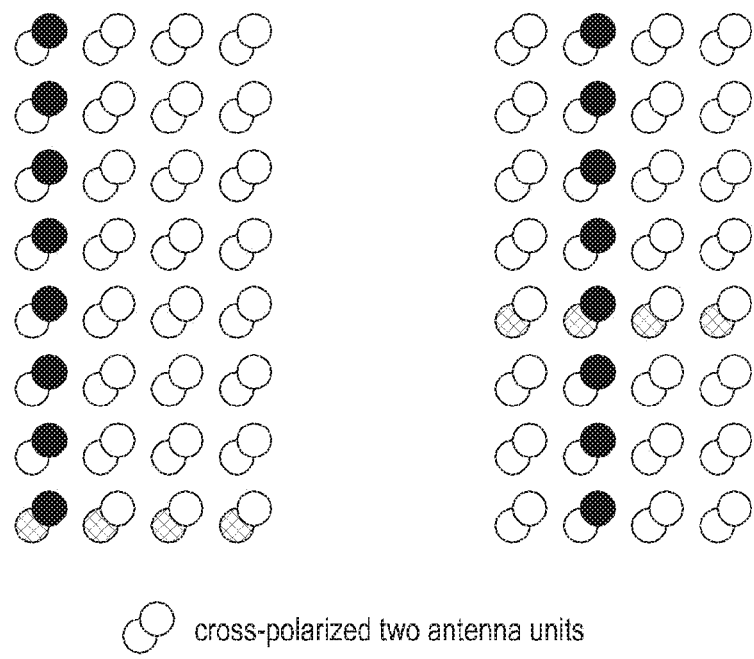
FIG. 16 is a schematic diagram illustrating a seventh CSI-RS configuration.

For a cross-polarized two-dimensional antenna array of M rows and N columns, a CSI-RS resource configured may include M NZP CSI-RS ports for measuring characteristics in a first polarized direction, and is denoted as CSI-RS-0; and another CSI-RS resource configured may include N NZP CSI-RS ports for measuring characteristics in a second polarized direction, and is denoted as CSI-RS-1. FIG. 16 is a schematic diagram illustrates this method. But the M NZP CSI-RS ports in the first polarized direction may not necessarily correspond to antenna units in the same column, and the N NZP CSI-RS ports in the second polarized direction may not necessarily correspond to antenna units in the same row.

Figure 13:
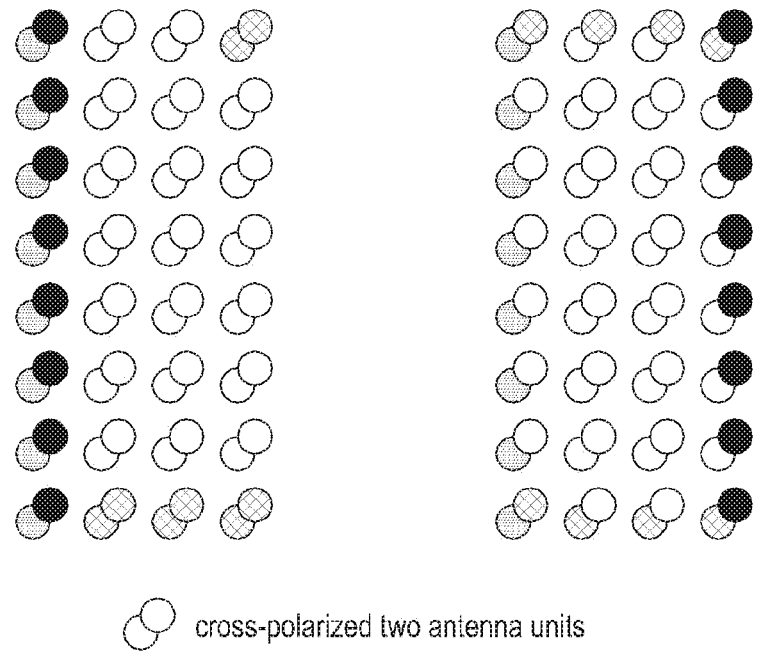
FIG. 13 is a schematic diagram illustrating a sixth CSI-RS configuration.

In addition, a cross-polarized two-dimensional antenna array having M rows and N columns may be divided into two groups of antenna units according to the polarization directions. CSI-RS is configured for each group of antenna units having the same polarization direction. In an example, the two polarization directions may be configured with the same number of CSI-RS ports to equally measure channel characteristics of the two polarization directions. Each group of antenna units having the same polarization direction includes M rows and N columns, the method as shown in FIGS. 8-12 may be adopted to allocate NZP CSI-RS, but methods other than that of FIGS. 8-12 may also be applicable. For example, as shown in FIG. 13, supposing a cross-polarized two-dimensional antenna array includes 8 rows and 4 columns, each group of 8-row 4-column antenna units having the same polarization direction may be configured with 12 CSI-RS ports, thus a total of 24 antenna ports need to be configured. The CSI of the whole antenna array is measured by using the 24 CSI-RS ports. As shown in the left drawing of FIG. 13, two polarization directions may adopt the same pattern for mapping the CSI-RS ports. Alternatively, as shown in the right drawing of FIG. 13, the two polarization direction may adopt different patterns to map the CSI-RS ports. According to conventional resource allocation method which support at most 8 CSI-RS ports, 3 groups of 8-port CSI-RS are required to transmit all CSI-RS ports. As shown in FIG. 13, different fillings are used to represent different 8-port CSI-RS.

Example 2

In a system configured with relatively more physical antenna units, examples of the present disclosure provide a method for reducing overhead. According to the method, multiple NZP CSI-RS resources are configured, and measurement results of the multiple NZP CSI-RS resources are combined to obtain the final CSI. The method of configuring multiple NZP CSI-RS resources is not restricted in the example.

In a conventional LTE system, a CSI process refers to a NZP CSI-RS resource and a ZP CSI-RS resource serving as CSI-IM. CSI-RS overhead can be reduced by configuring multiple NZP CSI-RS resources. Accordingly, a CSI process may be defined as including multiple NZP CSI-RS resources. Although multiple NZP CSI-RS resources are used in channel measurement, but characteristics of interference signals are not dependent on the method for measuring channels of CSI by using NZP CSI-RS resources. Therefore, interference measurement may still use only one CSI-IM resource. As such, in a system configured with relatively more physical antenna units, supposing channel characteristics are measured by configured multiple NZP CSI-RS resources, a CSI process may be configured with multiple NZP CSI-RS resources and one multiple ZP CSI-RS resource serving as CSI-IM resource. In an example, a CSI process may be configured with two NZP CSI-RS resources and a CSI-IM resource.

In conventional LTE systems, for a CSI process configured with two CSI subframe sets, e.g., in the situation where eIMTA is supported, definition of the CSI process has been extended to include a NZP CSI-RS resource and two ZP CSI-RS resources serving as CSI-IM resources. In order to obtain CSI feedback information for a CSI subframe set, REs of two CSI-IM resources in the CSI subframe set are used for measuring interferences. Alternatively, a base station implements a method of determining mapping between the two CSI-IM resources and the two CSI subframe sets. Corresponding to the above method, in a system configured with relatively more physical antenna units, supposing channel characteristics are measured by configured multiple NZP CSI-RS resources, a CSI process may be configured with multiple NZP CSI-RS resources and two ZP CSI-RS resources serving as CSI-IM resources. In an example, a CSI process may be configured with two NZP CSI-RS resources and two CSI-IM resources.

Example 3

In a system configured with relatively more physical antenna units, examples of the present disclosure provide a method for reducing overhead. According to the method, two NZP CSI-RS resources are configured, and measurement results of the two NZP CSI-RS resources are combined to obtain the final CSI. The method of configuring two NZP CSI-RS resources is not restricted in the example.

It is supposed a UE measures each NZP CSI-RS resource, and report CSI information of the NZP CSI-RS resource respectively. The CSI information includes at least PMI information obtained from measuring the NZP CSI-RS resource. With respect to RI and CQI, it is not restricted in the present disclosure whether a UE report RI and/or CQI for each NZP CSI-RS resource respectively or report a single RI and/or CQI obtained from combining the two CSI-RS resources. Denoting the PMI corresponding to the k'th CSI-RS resource as $PMI_k$, the UE may further report phase information between each pair of PMI to enable the base station to obtain an optimal combined PMI for data transmission to the UE according to each individual $PMI_k$. For example, supposing two CSI-RS resources are configured and a UE has reported $PMI_0$ and $PMI_1$ and each of which indicates a precoding vector which has one layer, the UE may further feed phase information back. The phase information is used for making signals of all the antenna units have the same phase to maximize the gain of beamforming during combination of $PMI_0$ and $PMI_1$ to generate the combined PMI.

Example 4

In a conventional LTE system, a CSI process refers to a NZP CSI-RS resource and a ZP CSI-RS resource serving as CSI-IM resource. In CSI measurement, NZP CSI-RS resource are used for channel measurement, CSI-MI resource are used for interference measurement. Results of the channel measurement and the interference measurement are combined to generate the CSI. The UE requires an assumption of a reference PDSCH transmission power when measuring CSI to make the CSI information obtained meet a certain target BLER value, e.g., 0.1. In conventional standards, the assumption of the reference PDSCH transmission power used by the UE in CSI measurement is defined, i.e., a ratio of the energy per RE (EPRE) of the PDSCH to the EPRE of NZP CSI-RS, denoted as Pc. In conventional LTE systems, EPRE of PDSCH on OFDM symbols that do not include CRS can be determined based on the Pc. Regarding the EPRE of PDSCH on OFDM symbols including CRS, influence of a parameter PB is also taken into consideration according to conventional LTE methods.

In a system configured with relatively more physical antenna units, examples of the present disclosure provide a method for reducing overhead. According to the method, multiple NZP CSI-RS resources are configured for a CSI process, and measurement results of the multiple NZP CSI-RS resources are combined to obtain the final CSI. The method of configuring multiple NZP CSI-RS resources is not restricted in the example.

For the multiple NZP CSI-RS resources configured to a CSI process, different NZP CSI-RS resources may have the same or different EPRE. The present disclosure does not restrict the reason that makes different NZP CSI-RS resources have different EPRE. A possible reason is that different NZP CSI-RS resources have different numbers of CSI-RS ports, which results in that different NZP CSI-RS resources have different energy boostings. For example, denoting the normalized energy of each antenna unit as P, supposing a first NZP CSI-RS resource includes 4 ports and supposing each NZP CSI-RS port has an energy boosting of 3 dB, the energy of each RE carrying NZP CSI-RS is 4P; supposing a second NZP CSI-RS resource includes 8 ports and supposing each NZP CSI-RS port has an energy boosting of 6 dB, the energy of each RE carrying NZP CSI-RS is 8P, i.e., when the NZP CSI-RS has different number of antenna ports, REs of the NZP CSI-RS have different EPREs. In addition, different NZP CSI-RS resources may have different functions, and thus may have different EPRE.

The multiple NZP CSI-RS resources of a CSI process may have different EPRE, which affects the assumption of the reference PDSCH transmission power when the UE measures CSI based on each NZP CSI-RS resource. The UE may use the same reference PDSCH transmission power in channel state measurement using different NZP CSI-RS resources. Alternatively, the base station may set different reference PDSCH transmission power for different NZP CSI-RS resources. Six examples of the method of the present disclosure is described as follows.

According to a first method of setting a reference PDSCH transmission power, N assumptions of the reference PDSCH transmission power may be set via higher layer signaling for a CSI process configured with N NZP CSI-RS resources, denoted as $P_c^{(k)}$, k=0, 1, ... N−1. When measuring CSI using the k'th NZP CSI-RS resource, the UE may determine the assumption of the reference PDSCH transmission power according to $P_c^{(k)}$. The referent PDSCH transmission power obtained by using the $P_c^{(k)}$ may be the same for the N NZP CSI-RS resources in channel state measurement of the UE. Alternatively, the base station may also set the $P_c^{(k)}$ such that the transmission power of the reference PDSCH is different for different NZP CSI-RS resources.

According to a second method for setting the reference PDSCH transmission power, an assumption of a reference PDSCH transmission power Pc may be configured via higher layer signaling for one of the multiple NZP CSI-RS resources configured to a CSI process, and thereby the reference PDSCH transmission power when CSI is measured using the NZP CSI-RS is configured. The UE may obtain assumption(s) of the reference PDSCH transmission power used in measuring CSI using other NZP CSI-RS resource(s) according to differences in the number of ports of the different NZP CSI-RS resources. For example, the differences in the number of CSI-RS ports may be compensated to obtain the same reference PDSCH transmission power for channel state measurement using each NZP CSI-RS resource. The NZP CSI-RS resource to which the Pc is configured may be specified in the higher layer signaling, i.e., the higher layer signaling may specify the index of the NZP CSI-RS resource corresponding to the Pc. Alternatively, it may be defined that the Pc is configured for a NZP CSI-RS resource that has a preset index, e.g., the index may be 0 or 1, and thus there is no need to specify the index in the higher layer signaling. The NZP CSI-RS resource to which the Pc is configured is herein referred to as reference NZP CSI-RS resource.

Denoting the number of ports of the reference NZP CSI-RS resource is $p_0$, and supposing the number of ports of another NZP CSI-RS resource is $p_k$, $p_0$ and $p_k$ are generally exponentiation values of 2, when the UE measures CSI using the k'th NZP CSI-RS resource, the assumption of the reference PDSCH transmission power $P_c^{(k)}$, i.e., the ratio of EPRE of the reference PDSCH to the EPRE of the k'th NZP CSI-RS, may be obtained according to the following formula:

$$P_c^{(k)} = \begin{cases} P_c & p_0 = 1, p_k = 1 \\ \frac{p_0}{2} \cdot P_c & p_0 \geq 2, p_k = 1 \\ \frac{2}{p_k} \cdot P_c & p_0 = 1, p_k \geq 2 \\ \frac{p_0}{p_k} \cdot P_c & p_0 \geq 2, p_k \geq 2 \end{cases}$$

According to a third method for configuring the reference PDSCH transmission power, an assumption of a reference PDSCH transmission power Pc may be configured via higher layer signaling for one of multiple NZP CSI-RS resources configured for a CSI process. As such, the reference PDSCH transmission power used in CSI measurement using the NZP CSI-RS resource is configured. The UE may use the same reference PDSCH transmission power in CSI measurement using each NZP CSI-RS resource. The NZP CSI-RS resource to which the Pc is configured may be specified in the higher layer signaling, i.e., the higher layer signaling may specify the index of the NZP CSI-RS resource corresponding to the Pc. Alternatively, it may be defined that the Pc is configured for a NZP CSI-RS resource that has a preset index, e.g., the index may be 0 or 1, and thus there is no need to specify the index in the higher layer signaling. The NZP CSI-RS resource to which the Pc is configured is herein referred to as reference NZP CSI-RS resource.

In an example, the UE may obtain assumption(s) of the reference PDSCH transmission power used in CSI measurement using each of the other NZP CSI-RS resource(s) based on the Pc configured for the reference NZP CSI-RS resource and differences in the number of ports of different NZP CSI-RS resources under the condition of using the same reference PDSCH transmission power for each NZP CSI-RS. Similar to the above second method of configuring the reference PDSCH transmission power, denoting the number of ports of the referent NZP CSI-RS resource is $p_0$, supposing the number of ports of anther NZP CSI-RS resource is $p_k$, $p_0$ and $p_k$ are generally exponentiations of 2, when the UE measures CSI using the k'th NZP CSI-RS resource, the assumption of the reference PDSCH transmission power $P_c^{(k)}$, i.e., the ratio of EPRE of the reference PDSCH to EPRE of the k'th NZP CSI-RS resource, may be obtained by using the following formula:

$$P_c^{(k)} = \begin{cases} P_c & p_0 = 1, p_k = 1 \\ \frac{p_0}{2} \cdot P_c & p_0 \geq 2, p_k = 1 \\ \frac{2}{p_k} \cdot P_c & p_0 = 1, p_k \geq 2 \\ \frac{p_0}{p_k} \cdot P_c & p_0 \geq 2, p_k \geq 2 \end{cases}$$

According to a fourth method of configuring a reference PDSCH transmission power, for a CSI process configured with N NZP CSI-RS resources, an assumption of a reference PDSCH transmission power Pc may be configured and applied to all N NZP CSI-RS resources. That is, EPRE of the reference PDSCH for each NZP CSI-RS may be obtained by using the Pc and the EPRE of the NZP CSI-RS. According to this method, the base station functions to ensure that applying the same Pc to all the N NZP CSI-RS resources can meet the performance requirements of CSI measurement. If the N NZP CSI-RS resources have different EPRE, the reference PDSCH transmission powers of different NZP CSI-RS are also different. Alternatively, even if the N NZP CSI-RS resources have different number of ports, the base station may still configure the N NZP CSI-RS resources to use identical EPRE so that sharing the same Pc may still result in the UE using the same reference PDSCH transmission power in channel state measurement based on each of N NZP CSI-RS resources. In this example, it is supposed that different NZP CSI-RS resources have different number of ports, and the NZP CSI-RS ports of the different NZP CSI-RS resources have different energy boostings.

According to a fifth method of configuring a reference PDSCH transmission power, the UE may use a preset Pc value, e.g., 0 dB, in CSI measurement using some of the multiple NZP CSI-RS resources of a CSI process. While the parameter Pc used in determining the reference PDSCH transmission power for other NZP CSI-RS resources may be configured using the above 4 methods. In an example, supposing a CSI process includes two NZP CSI-RS resources respectively denoted as CSI-RS-A and CSI-RS-B, the UE may first measure CSI-RS-A and report measured $PMI_A$ to the base station. The base station precodes CSI-RS-B according to the $PMI_A$ and transmits the CSI-RS-B. The UE performs measurement based on the CSI-RS-B and feeds back measured CSI. The CSI-RS-A is used for obtaining the $PMI_A$ for precoding the CSI-RS-B, and is not directly related to transmission of the reference PDSCH. Thus, the UE may measure $PMI_A$ assuming the ratio of the power of PDSCH signals to the EPRE of the CSI-RS-A is 1. The Pc configured via higher layer signaling is used only for determining the reference PDSCH transmission power in CSI measurement based on the CSI-RS-B.

According to the sixth method of configuring a reference PDSCH transmission power, according to usages of the multiple NZP CSI-RS resources, the UE may perform CSI measurement based on some of the multiple NZP CSI-RS resources without additional assumptions of signal powers, and obtain the parameter Pc for use in determining the reference PDSCH transmission power for other NZP CSI-RS resources by using the above 4 methods. In an example, supposing a CSI process includes two NZP CSI-RS resources respectively denoted as CSI-RS-A and CSI-RS-B, the UE may report $PMI_A$ through measurement based on the CSI-RS-A to the base station, but does not feed back other information such as CQI. The base station precodes the CSI-RS-B using the $PMI_A$ and transmits the CSI-RS-B. The UE performs measurement based on the CSI-RS-B and feeds back measured CSI. Regarding CSI-RS-A, the UE may directly obtain $PMI_A$ using the CSI-RS-A in measurement without additional assumption of a signal power because there is no need to feed back other information such as CQI. The Pc configured via the higher layer signaling is used only in determining the reference PDSCH transmission power for CSI measurement based on the CSI-RS-B.

According to the above four examples, a CSI process is configured with multiple NZP CSI-RS resources for CSI measurement to obtain complete CSI information and reduce the overhead of NZP CSI-RS resources. The following example illustrates a design of DMRS transmission to better support MU-MIMO.

Example 5

Figure 14:
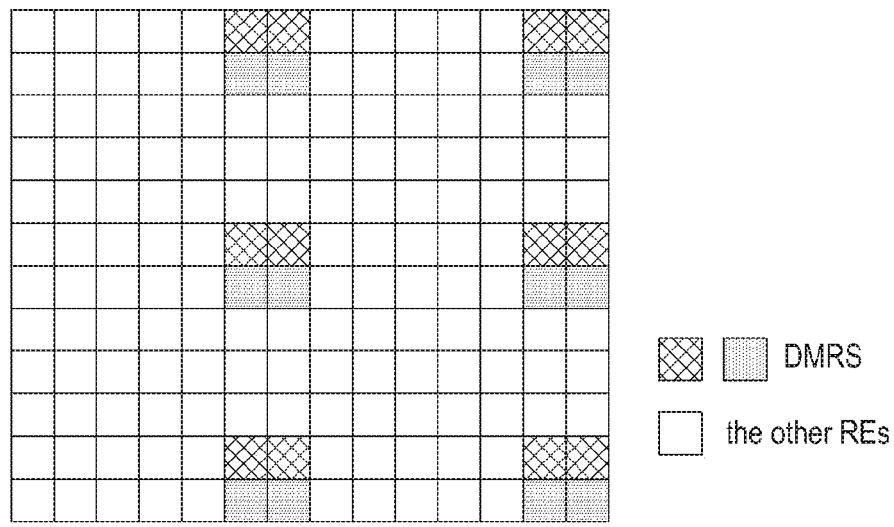
FIG. 14 is a schematic diagram illustrating DMRS.

FIG. 14 is a schematic diagram illustrating DMRS mappings of conventional LTE systems. When MU-MIMO needs to be supported, conventional LTE systems only support multiplexing the DMRS of multiple UEs in 12 REs (e.g., REs filled with grids in FIG. 14). In an example, a Walsh code having a length of 2 is adopted for time-expanded, DMRS ports 7 and 8 are used for DMRS transmission, and different $n_{SCID}$ are configured to generate two quasi-orthogonal DMRS sequences. DMRS sequences generated using the same $n_{SCID}$ for DMRS ports are fully orthogonal, while DMRS sequences generated using different $n_{SCID}$ are quasi-orthogonal.

In a system configured with relatively more physical antenna units, e.g., with 16, 32, 64 or more transmitting antenna units, the increase in the number of antenna units enables better support of MU-MIMO. But conventional LTE methods only support two fully orthogonal DMRS ports, thus the multiplexing PDSCH of multiple UE on the same resources have limited performances. In an example, two methods to extend DMRS ports are provided. Scheduling signaling sent by a base station to a UE specifies DMRS ports allocated to the UE. The UE receives DMRS signals, performs channel estimation and downlink data processing using the DMRS ports. The DMRS ports allocated to the UE are not limited to fully orthogonal DMRS ports supporting MU-MIMO as in conventional LTE methods, but include other ports. The following are a few examples.

A method increases REs used for DMRS to better support orthogonal DMRS ports. For example, as shown in FIG. 14, all of 24 DMRS REs are used DMRS transmission for MU-MIMO support, i.e., DMRS ports 7-10 defined in conventional LTE standards are made to support MU-MIMO. But according to this method, the number of REs actually available for PDSCH transmission is reduced by 12, thus performances of PDSCH transmission may be affected.

In order to reduce DMRS overhead, when DMRS is only transmitting in the RE collection of port 7, the base station may instruct the UE to receive PDSCH from the RE collection of port 9. In an example, $N_{DMRS}$ denoting the number of RE collections occupied by DMRS is $N_{DMRS}$, the scheduling signal may include the $N_{DMRS}$ to specify the RE collections actually occupied by DMRS. A $N_{DMRS}$ having a value of 1 indicates DMRS is only transmitted in the RE collection of port 7, and a $N_{DMRS}$ having a value of 2 indicates DMRS is transmitted in the RE collections of port 7 and port 9. Table 3 is an example of this method. When a single codeword is transmitted or re-transmitted in a single layer, if $N_{DMRS}$ equals 1, indication information is required to specify DMRS port 7 or 8 and specify whether $n_{SCID}$ equals 0 or 1, i.e., there are 4 possibilities that need to be specified; if $N_{DMRS}$ equals 2, indication information is required to specify one of DMRS ports 7-10 and specify whether $n_{SCID}$ equals 0 or 1, i.e., there are 8 possibilities that need to be specified. When a codeword occupying 2 layers in initially transmission is re-transmitted, indication information is required to specify whether $N_{DMRS}$ equals 1 or 2 because data of other UE(s) may be involved in the MU-MIMO transmission, and accordingly, there are 2 possibilities that need to be specified, and $n_{SCID}$ equals 0 by default. When a codeword occupying 3 or 4 layers in initial transmission is re-transmitted, there are 2 possibilities that need to be specified, and $n_{SCID}$ equals 0 by default. Regarding transmission of two codewords, when two layers are allocated to the UE, if $N_{DMRS}$ equals 1, ports 7 and 8 may be used, and indication information is required to specify whether $n_{SCID}$ equals 0 or 1, so there are two possibilities; if $N_{DMRS}$ equals 2, ports 7 and 8 or ports 9 and 10 may be used, and $n_{SCID}$ may be 0 or 1, thus, there are 4 possibilities that need to be specified; when more than 3 layers are allocated to the UE, only SU-MIMO is supported, thus there are 6 possibilities, i.e., the total number of layers may be 3, 4, 5, 6, 7, 8, and $n_{SCID}$ equals 0 by default.

According to another method, the number of REs for DMRS is not increased, i.e., the 12 REs filled with grids as shown in FIG. 14 are still used, the length of a Walsh code for time-expanded is increased to support MU-MIMO transmission of DMRS so as to multiplex more orthogonal DMRS.

A time-expanded code having a length of 4 is used on the 12 DMRS REs for MU-MIMO, and 4 DMRS ports that can be used are 7, 8, 11 and 13. Table 4 is the time-expanded codes to which the 4 ports are mapped. The relationships regarding orthogonality between the 4 time-expanded codes are different. For example, the time-expanded code of port 7 has the best orthogonality with the time-expanded code of port 8, but has the worst orthogonality with the time-expanded code of port 11. In conventional LTE standards, when dual-layer transmission is supported, port 7 and port 8 are allocated to a UE, i.e., allocating two time-expanded codes that have the best orthogonality of the 4 time-expanded codes as shown in Table 4 to the same UE. In order to add flexibility to DMRS allocation of a base station, during DMRS allocation, the two ports that have the best orthogonality in the 4 DMRS ports may be allocated to different layers of the same UE to reduce interference between the two layers of the UE, or may be allocated to different UEs to reduce interference between the UEs.

TABLE 4

Table 4: time-expanded codes of DMRS ports

| DMRS ports | time-expanded code |
|---|---|
| 7 | [+1 +1 +1 +1] |
| 8 | [+1 −1 +1 −1] |
| 11 | [+1 +1 −1 −1] |
| 13 | [+1 −1 −1 +1] |

Table 5 illustrates a method for specifying the number of layers allocated and DMRS ports in accordance with an example of the present disclosure. When a single codeword is transmitted or re-transmitted using a single layer, indication information is required to specify one of DMRS ports 7, 8, 11, 13 and specify whether $n_{SCID}$ is 0 or 1, thus there are 8 possibilities that need to be specified. When a single codeword is $n_{SCID}$-transmitted and the number of layers in initial transmission is larger than or equal to 2, additional indication information is required to specify whether the number of layers is 2, 3, or 4, i.e., there are 3 possibilities, and $n_{SCID}$ is 0 by default. Regarding transmission of two codewords, when two layers are allocated to the UE, ports 7 and 8, or ports 11 and 13, or ports 7 and 11, or ports 8 and 13 may be used, and $n_{SCID}$ may be 0 or 1, thus, there are 8

TABLE 3

Table 3: method of specifying the number of layers allocated and DMRS ports

| | codeword 0 available, codeword 1 unavailable | | both codewords available |
|---|---|---|---|
| Value | Information | Value | Information |
| 0 | 1 layer, port 7, $n_{SCID} = 0$, $N_{DMRS} = 1$ | 0 | 2 layers, port 8, $n_{SCID} = 0$, $N_{DMRS} = 1$ |
| 1 | 1 layer, port 7, $n_{SCID} = 1$, $N_{DMRS} = 1$ | 1 | 2 layers, ports 7-8, $n_{SCID} = 1$, $N_{DMRS} = 1$ |
| 2 | 1 layer, port 8, $n_{SCID} = 0$, $N_{DMRS} = 1$ | 2 | 2 layers, ports 7-8, $n_{SCID} = 0$, $N_{DMRS} = 2$ |
| 3 | 1 layer, port 8, $n_{SCID} = 1$, $N_{DMRS} = 1$ | 3 | 2 layers, ports 7-8, $n_{SCID} = 1$, $N_{DMRS} = 2$ |
| 4 | 1 layer, port 7, $n_{SCID} = 0$, $N_{DMRS} = 2$ | 4 | 2 layers, ports 9 and 10, $n_{SCID} = 0$, $N_{DMRS} = 2$ |
| 5 | 1 layer, port 7, $n_{SCID} = 1$, $N_{DMRS} = 2$ | 5 | 2 layers, ports 9 and 10, $n_{SCID} = 1$, $N_{DMRS} = 2$ |
| 6 | 1 layer, port 8, $n_{SCID} = 0$, $N_{DMRS} = 2$ | 6 | 3 layers, ports 7-9 |
| 7 | 1 layer, port 8, $n_{SCID} = 1$, $N_{DMRS} = 2$ | 7 | 4 layers, ports 7-10 |
| 8 | 1 layer, port 9, $n_{SCID} = 0$, $N_{DMRS} = 2$ | 8 | 5 layers, ports 7-11 |
| 9 | 1 layer, port 9, $n_{SCID} = 1$, $N_{DMRS} = 2$ | 9 | 6 layers, ports 7-12 |
| 10 | 1 layer, port 10, $n_{SCID} = 0$, $N_{DMRS} = 2$ | 10 | 7 layers, ports 7-13 |
| 11 | 1 layer, port 10, $n_{SCID} = 1$, $N_{DMRS} = 2$ | 11 | 8 layers, ports 7-14 |
| 12 | 2 layers, ports 7-8, $n_{SCID} = 0$, $N_{DMRS} = 1$ | 12 | reserved |
| 13 | 2 layers, ports 7-8, $n_{SCID} = 0$, $N_{DMRS} = 2$ | 13 | reserved |
| 14 | 3 layers, ports 7-9 | 14 | reserved |
| 15 | 4 layers, ports 7-10 | 15 | reserved | possibilities that need to be specified; when more than 3 layers are allocated to the UE, only SU-MIMO is supported, thus there are 6 possibilities, i.e., the total number of layers may be 3, 4, 5, 6, 7, 8, and $n_{SCID}$ equals 0 by default.

TABLE 5

Table 5: method of specifying the number of allocated layers and DMRS ports

| | codeword 0 available, codeword 1 unavailable | | both codewords available |
|---|---|---|---|
| Value | Information | Value | Information |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 2 layers, ports 11 and 13, $n_{SCID}$ = 0 |
| 3 | 1 layer, port 8, $n_{SCID}$ = 1 | 3 | 2 layers, ports 11 and 13, $n_{SCID}$ = 1 |
| 4 | 1 layer, port 11, $n_{SCID}$ = 0 | 4 | 2 layers, ports 7 and 11, $n_{SCID}$ = 0 |
| 5 | 1 layer, port 11, $n_{SCID}$ = 1 | 5 | 2 layers, ports 7 and 11, $n_{SCID}$ = 1 |
| 6 | 1 layer, port 13, $n_{SCID}$ = 0 | 6 | 2 layers, ports 8 and 13, $n_{SCID}$ = 0 |
| 7 | 1 layer, port 13, $n_{SCID}$ = 1 | 7 | 2 layers, ports 8 and 13, $n_{SCID}$ = 1 |
| 8 | 2 layers, ports 7-8 | 8 | 3 layers, ports 7-9 |
| 9 | 3 layers, ports 7-9 | 9 | 4 layers, ports 7-10 |
| 10 | 4 layers, ports 7-10 | 10 | 5 layers, ports 7-11 |
| 11 | reserved | 11 | 6 layers, ports 7-12 |
| 12 | reserved | 12 | 7 layers, ports 7-13 |
| 13 | reserved | 13 | 8 layers, ports 7-14 |
| 14 | reserved | 14 | reserved |
| 15 | reserved | 15 | reserved |

According to the method of Table 5, the UE may perform channel estimation without the need of any information on the length of the time-expanded code, or the UE may perform channel estimation always regarding the length of the time-expanded code is 4.

The length of the time-expanded code may be specified along with the number of layers and DMRS ports because a time-expanded code whose length is 2 has better despreading performances than a time-expanded code whose length is 4, so that the UE may use the length of the time-expanded code in improving channel estimation results. The length of the time-expanded code is denoted as Locc. Table 6 is an example of this method. When a single codeword is transmitted or re-transmitted in a single layer, if Locc equals 2, indication information is required to specify DMRS port 7 or 8 and specify whether $n_{SCID}$ equals 0 or 2, i.e., there are 4 possibilities that need to be specified; if Locc equals 4, indication information is required to specify one of DMRS ports 7, 8, 11 and 13 and specify whether $n_{SCID}$ equals 0 or 1, i.e., there are 8 possibilities that need to be specified. When a codeword occupying 2 layers in initially transmission is re-transmitted, further indication information is required to specify whether Locc equals 2 or 4 because data of other UE(s) may be involved in the MU-MIMO transmission, and accordingly, there are 2 possibilities that need to be specified, and $n_{SCID}$ equals 0 by default. When a codeword occupying 3 or layers in initial transmission is re-transmitted, there are 2 possibilities that need to be specified, and $n_{SCID}$ equals 0 by default. When two codewords are transmitted, if the number of layers allocated to the UE is 2, if Locc=2, ports 7 and 8 may be used, $n_{SCID}$ may be 0 or 1, i.e., there are 2 possibilities that need to be specified; if Locc=4, ports 7 and 8, or ports 11 and 13 may be used, $n_{SCID}$ may be 0 or 1, i.e., there are 4 possibilities that need to be specified; if the number of layers allocated to the UE is larger than or equal to 3, only SU-MIMO is supported, and therefore 6 possibilities need to be specified, i.e., the total number of layers may be 3, 4, 5, 6, 7 and 8, $n_{SCID}$ is 0 by default.

TABLE 6

Table 6: method of specifying the number of allocated layers and DMRS ports

| | codeword 0 available, codeword 1 unavailable | | both codewords available |
|---|---|---|---|
| Value | Information | Value | Information |
| 0 | 1 layer, port 7, $n_{SCID}$ = 0, $L_{OCC}$ = 2 | 0 | 2 layers, ports 7-8, $n_{SCID}$ = 0, $L_{OCC}$ = 2 |
| 1 | 1 layer, port 7, $n_{SCID}$ = 1, $L_{OCC}$ = 2 | 1 | 2 layers, ports 7-8, $n_{SCID}$ = 1, $L_{OCC}$ = 2 |
| 2 | 1 layer, port 8, $n_{SCID}$ = 0, $L_{OCC}$ = 2 | 2 | 2 layers, ports 7-8, $n_{SCID}$ = 0, $L_{OCC}$ = 4 |
| 3 | 1 layer, port 8, $n_{SCID}$ = 1, $L_{OCC}$ = 2 | 3 | 2 layers, ports 7-8, $n_{SCID}$ = 1, $L_{OCC}$ = 4 |
| 4 | 1 layer, port 7, $n_{SCID}$ = 0, $L_{OCC}$ = 4 | 4 | 2 layers, ports 11 and 13, $n_{SCID}$ = 0, $L_{OCC}$ = 4 |
| 5 | 1 layer, port 7, $n_{SCID}$ = 1, $L_{OCC}$ = 4 | 5 | 2 layers, ports 11 and 13, $n_{SCID}$ = 1, $L_{OCC}$ = 4 |
| 6 | 1 layer, port 8, $n_{SCID}$ = 0, $L_{OCC}$ = 4 | 6 | 3 layers, ports 7-9 |
| 7 | 1 layer, port 8, $n_{SCID}$ = 1, $L_{OCC}$ = 4 | 7 | 4 layers, ports 7-10 |
| 8 | 1 layer, port 11, $n_{SCID}$ = 0, $L_{OCC}$ = 4 | 8 | 5 layers, ports 7-11 |
| 9 | 1 layer, port 11, $n_{SCID}$ = 1, $L_{OCC}$ = 4 | 9 | 6 layers, ports 7-12 |
| 10 | 1 layer, port 13, $n_{SCID}$ = 0, $L_{OCC}$ = 4 | 10 | 7 layers, ports 7-13 |
| 11 | 1 layer, port 13, $n_{SCID}$ = 1, $L_{OCC}$ = 4 | 11 | 8 layers, ports 7-14 |
| 12 | 2 layers, ports 7-8, $n_{SCID}$ = 0, $L_{OCC}$ = 2 | 12 | reserved |
| 13 | 2 layers, ports 7-8, $n_{SCID}$ = 0, $L_{OCC}$ = 4 | 13 | reserved |
| 14 | 3 layers, ports 7-9 | 14 | reserved |
| 15 | 4 layers, ports 7-10 | 15 | reserved |

A method as shown in Table 7 may be obtained by combining the methods of Table 5 and Table 6. According to the method, transmission of data occupying 2 layers uses ports 7 and 8, ports 11 and 13, ports 7 and 11, or ports 8 and 13, and Locc is specified.

TABLE 7

Table 7: method of specifying the number of allocated layers and DMRS ports

| codeword 0 available, codeword 1 unavailable | | both codewords available | |
|---|---|---|---|
| Value | Information | Value | Information |
| 0 | 1 layer, port 7, $n_{SCID} = 0$, $L_{OCC} = 2$ | 0 | 2 layers, ports 7-8, $n_{SCID} = 0$, $L_{OCC} = 2$ |
| 1 | 1 layer, port 7, $n_{SCID} = 1$, $L_{OCC} = 2$ | 1 | 2 layers, ports 7-8, $n_{SCID} = 1$, $L_{OCC} = 2$ |
| 2 | 1 layer, port 8, $n_{SCID} = 0$, $L_{OCC} = 2$ | 2 | 2 layers, ports 7-8, $n_{SCID} = 0$, $L_{OCC} = 4$ |
| 3 | 1 layer, port 8, $n_{SCID} = 1$, $L_{OCC} = 2$ | 3 | 2 layers, ports 7-8, $n_{SCID} = 1$, $L_{OCC} = 4$ |
| 4 | 1 layer, port 7, $n_{SCID} = 0$, $L_{OCC} = 4$ | 4 | 2 layers, ports 11 and 13, $n_{SCID} = 0$, $L_{OCC} = 4$ |
| 5 | 1 layer, port 7, $n_{SCID} = 1$, $L_{OCC} = 4$ | 5 | 2 layers, ports 11 and 13, $n_{SCID} = 1$, $L_{OCC} = 4$ |
| 6 | 1 layer, port 8, $n_{SCID} = 0$, $L_{OCC} = 4$ | 6 | 2 layers, ports 7 and 11, $n_{SCID} = 0$, $L_{OCC} = 4$ |
| 7 | 1 layer, port 8, $n_{SCID} = 1$, $L_{OCC} = 4$ | 7 | 2 layers, ports 7 and 11, $n_{SCID} = 1$, $L_{OCC} = 4$ |
| 8 | 1 layer, port 11, $n_{SCID} = 0$, $L_{OCC} = 4$ | 8 | 2 layers, ports 8 and 13, $n_{SCID} = 0$, $L_{OCC} = 4$ |
| 9 | 1 layer, port 11, $n_{SCID} = 1$, $L_{OCC} = 4$ | 9 | 2 layers, ports 8 and 13, $n_{SCID} = 1$, $L_{OCC} = 4$ |
| 10 | 1 layer, port 13, $n_{SCID} = 0$, $L_{OCC} = 4$ | 10 | 3 layers, ports 7-9 |
| 11 | 1 layer, port 13, $n_{SCID} = 1$, $L_{OCC} = 4$ | 11 | 4 layers, ports 7-10 |
| 12 | 2 layers, ports 7-8, $n_{SCID} = 0$, $L_{OCC} = 2$ | 12 | 5 layers, ports 7-11 |
| 13 | 2 layers, ports 7-8, $n_{SCID} = 0$, $L_{OCC} = 4$ | 13 | 6 layers, ports 7-12 |
| 14 | 3 layers, ports 7-9 | 14 | 7 layers, ports 7-13 |
| 15 | 4 layers, ports 7-10 | 15 | 8 layers, ports 7-14 |

The method of example five can support more DMRS ports being used for MU-MIMO.

Figure 15:
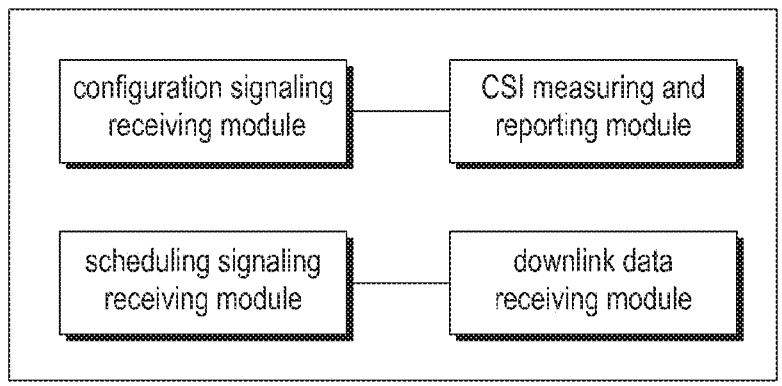
FIG. 15 is a schematic diagram illustrating modules of a data transmitting apparatus in accordance with an embodiment of the present disclosure.

The above are several examples of the data transmission method of the present disclosure. The present disclosure also provides a data transmission apparatus configured to implement the above data transmission method. FIG. 15 is a schematic diagram illustrating modules of a data transmitting apparatus in accordance with an embodiment of the present disclosure. As shown in FIG. 15, the data transmission apparatus may include: a configuration signaling receiving module, a CSI measuring and reporting module, a scheduling signaling receiving module and a downlink data receiving module.

The configuration signaling receiving module is configured to receive configuration signaling for CSI-RS sent by a base station. The CSI measuring and reporting module is configured to measure and report CSI according to the configuration signaling for CSI-RS. The scheduling signaling receiving module is configured to receive scheduling signaling sent by the base station. The downlink data receiving module is configured to receive downlink data according to the scheduling signaling.

In an example, configuration information of a CSI process in the configuration signaling received by the configuration signaling receiving module may include configuration information of at least two NZP CSI-RS resources. The CSI measuring and reporting module may receive NZP CSI-RS signals according to configuration information of all NZP CSI-RS resources of the CSI process, and combine measurement results of all NZP CSI-RS signals received in a CSI process to obtain the CSI information.

The scheduling signaling received by the scheduling signaling receiving module may include information of DMRS ports allocated to the UE, the number of data transmission layers and the number of RE collections actually occupied by DMRS denoted as $N_{DMRS}$. The downlink data receiving module may receive DMRS signals according to the DMRS ports allocated and the number of data transmission layers in the scheduling signaling. DMRS 7-10 are used for supporting MU-MIMO transmission of DMRS signals. When $N_{DMRS}$ indicates DMRS signals are only transmitted in the RE collection of port 7, the downlink data receiving module may receive PDSCH on the RE collection of port 9.

Alternatively, the scheduling signaling received by the scheduling signaling receiving module includes information of DMRS ports allocated to the UE and the number of data transmission layers. The length of a time-expanded Walsh code is added to support MU-MIMO transmission. DMRS ports allocated to the UE are DMRS ports that have the best orthogonality in all of DMRS ports that support MU-MIMO. Alternatively, DMRS ports that have the best orthogonality in all of DMRS ports that support MU-MIMO are allocated to different UEs. In an example, the scheduling signaling may also include the length Locc of the time-expanded code corresponding to the DMRS port allocated to the UE.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed:

1. A method of a user equipment (UE), the method comprising:
receiving configuration information related to a channel state information (CSI) process, the configuration information comprising configuration information of N non-zero power (NZP) channel state information reference signal (CSI-RS) resources; and
measuring a channel state based on the configuration information,
wherein the CSI process is associated with multiple NZP CSI-RS resources,
wherein the UE assumes reference physical downlink shared channel (PDSCH) transmission power corresponding to the multiple NZP CSI-RS resources based on at least one parameter configured via higher layer signaling for measuring the channel state for the CSI process based on the multiple NZP CSI-RS resources,
wherein the at least one parameter includes $P_c$ which is an assumed ratio of PDSCH energy per resource element (EPRE) to NZP CSI-RS EPRE, and
wherein the higher layer signaling comprises the $P_c$ of the reference PDSCH transmission power configured for the N NZP CSI-RS resources.

2. The method of claim 1, further comprising:
measuring interference based on one zero power (ZP) CSI interference measurement (CSI-IM) resource.

3. The method of claim 1, further comprising:
receiving scheduling information from a base station; and
receiving downlink data based on the scheduling information.

4. The method of claim 3, wherein:
the scheduling information comprises information of de-modulation reference signal (DMRS) ports allocated to the UE, a number of data transmission layers and a number of resource element (RE) collections occupied by DMRSs,
the UE receives the DMRSs based on the allocated DMRS ports and the number of data transmission layers,
DMRS ports 7-10 are used for supporting multi-user multiple input multiple output (MU-MIMO) transmission of the DMRSs, and
the UE receives a PDSCH from an RE collection of port 9 when the DMRSs are transmitted using an RE collection of port 7.

5. The method of claim 3, further comprising:
increasing a length of a time-expanded Walsh code to support multi-user multiple input multiple output (MU-MIMO) transmission of de-modulation reference signals (DMRSs) signals, DMRS ports having best orthogonality among all of DMRS ports that support MU-MIMO are allocated to different layers of the UE or to different UEs,
wherein the scheduling information comprises information of DMRS ports allocated to the UE and the number of data transmission layers.

6. The method of claim 1, wherein measuring the channel state comprises:
measuring channel characteristics of a two-dimensional antenna array on an axis x and an axis y respectively,
wherein the axis x and the axis y are directions respectively corresponding to two dimensions of the two-dimensional antenna array.

7. The method of claim 6, wherein receiving the configuration information comprises:
receiving CSI-RS signals via NZP CSI-RS ports on which channel characteristics on the axis x and the axis y are measured,
wherein an NZP CSI-RS signal for measuring the channel characteristics on the axis x and the axis y is received from one NZP CSI-RS port for a shared antenna unit on the axis x and the axis y, and an NZP CSI-RS signal for measuring channel characteristics of another antenna unit is received from the other NZP CSI-RS port for the shared antenna unit.

8. The method of claim 6, wherein antenna units in a cross-polarized two-dimensional antenna array are divided into two groups according to polarization directions,
   wherein the configuration information comprises configuration information of NZP CSI-RS ports corresponding to each group of antenna units having the same polarization direction, and
   wherein the two groups of antenna units are configured with the same number of NZP CSI-RS ports.

9. The method of claim 1, further comprising:
   reporting a pre-coding matrix indicator (PMI) and information of a phase between each pair of PMIs.

10. The method of claim 1,
    wherein the $P_c$ corresponds to an index k, k is the index of each NZP CSI-RS resource, k=0, 1, ... N−1, and N is an integer larger than 2, and
    wherein the UE assumes the reference PDSCH transmission power based on the $P_c$ when measuring CSI based on the $k^{th}$ NZP CSI-RS resource.

11. The method of claim 1, wherein the UE calculates the reference PDSCH transmission power corresponding to a portion of the multiple NZP CSI-RS resources based on a pre-set assumption of the reference PDSCH transmission power, and
    wherein the channel state is measured based on a portion of the multiple NZP CSI-RS resources without using an assumption of the reference PDSCH transmission power.

12. A user equipment (UE) for data processing, the UE comprising:
    a transceiver configured to receive configuration information related to a channel state information (CSI) process from a base station (BS), the configuration information comprising configuration information of N non-zero power (NZP) channel state information reference signal (CSI-RS) resources; and
    at least one processor configured to measure a channel state based on the configuration information,
    wherein the CSI process is associated with multiple NZP CSI-RS resources,
    wherein the UE assumes reference physical downlink shared channel (PDSCH) transmission power corresponding to the multiple NZP CSI-RS resources based on at least one parameter configured via higher layer signaling for measuring the channel state for the CSI process based on the multiple NZP CSI-RS resources,
    wherein the at least one parameter includes $P_c$ which is an assumed ratio of PDSCH energy per resource element (EPRE) to NZP CSI-RS EPRE, and
    wherein the higher layer signaling comprises the Pc of the reference PDSCH transmission power configured for the N NZP CSI-RS resources.

13. The UE of claim 12, wherein the UE measures interference based on one zero power (ZP) CSI interference measurement (CSI-IM) resource.

14. The UE of claim 12, further comprising:
    a scheduler configured to receive scheduling information from the base station, receives downlink data based on the scheduling information.

15. The UE of claim 14, wherein the scheduling information comprises information of de-modulation reference signal (DMRS) ports allocated to the UE, the number of data transmission layers, and
    wherein the UE increases the length of a time-expanded Walsh code to support MU-MIMO transmission of DMRS signals, and the DMRS ports having best orthogonality among all of DMRS ports that support MU-MIMO are allocated to different layers of the UE or to different UEs.

16. The UE of claim 12,
    wherein the $P_c$ corresponds to an index k, k is the index of each NZP CSI-RS resource, k=0, 1, ... N−1, and N is an integer larger than 2, and
    wherein the UE assumes the reference PDSCH transmission power based on $P_c$ when measuring CSI based on the $k^{th}$ NZP CSI-RS resource.

* * * * *